Feb. 3, 1931.　　　H. C. GRAWUNDER　　　1,791,201
PLOW ATTACHMENT
Filed Feb. 14, 1930　　　2 Sheets-Sheet 1

Inventor
H. C. Grawunder

By Clarence A. O'Brien,
Attorney

Patented Feb. 3, 1931

1,791,201

UNITED STATES PATENT OFFICE

HENRY C. GRAWUNDER, OF BELLEVILLE, TEXAS

PLOW ATTACHMENT

Application filed February 14, 1930. Serial No. 428,417.

This invention relates to a supplemental appurtenance in the nature of an attachment for what is generally known as a tractor plow.

A tractor plow structure such as is shown in Patent 1,719,743 granted to R. J. Altgelt et al, constitutes the primary part of the invention, but the novelty is founded upon a supplemental attachment which is used in association with the plow structure to permit the patented plow structure to have the additional function of simultaneously terracing and ditching the ground.

It follows that the fundamental novelty of the present application is predicated upon an appliance used in conjunction with the patented plow above mentioned, the improvements being in the nature of an attaching bar member, and an additional concavo-convex disc cooperating with one of the plow discs on the existing tractor plow.

Briefly stated, the attachment comprises a pivotally mounted bar having its outer end offset laterally in an upward direction and a forward direction to properly locate the concavo convex disc which is mounted thereon. The purpose of this arrangement is to elevate supplemental discs to accomplish the desired terracing and ditching of the ground covered.

Figure 1:
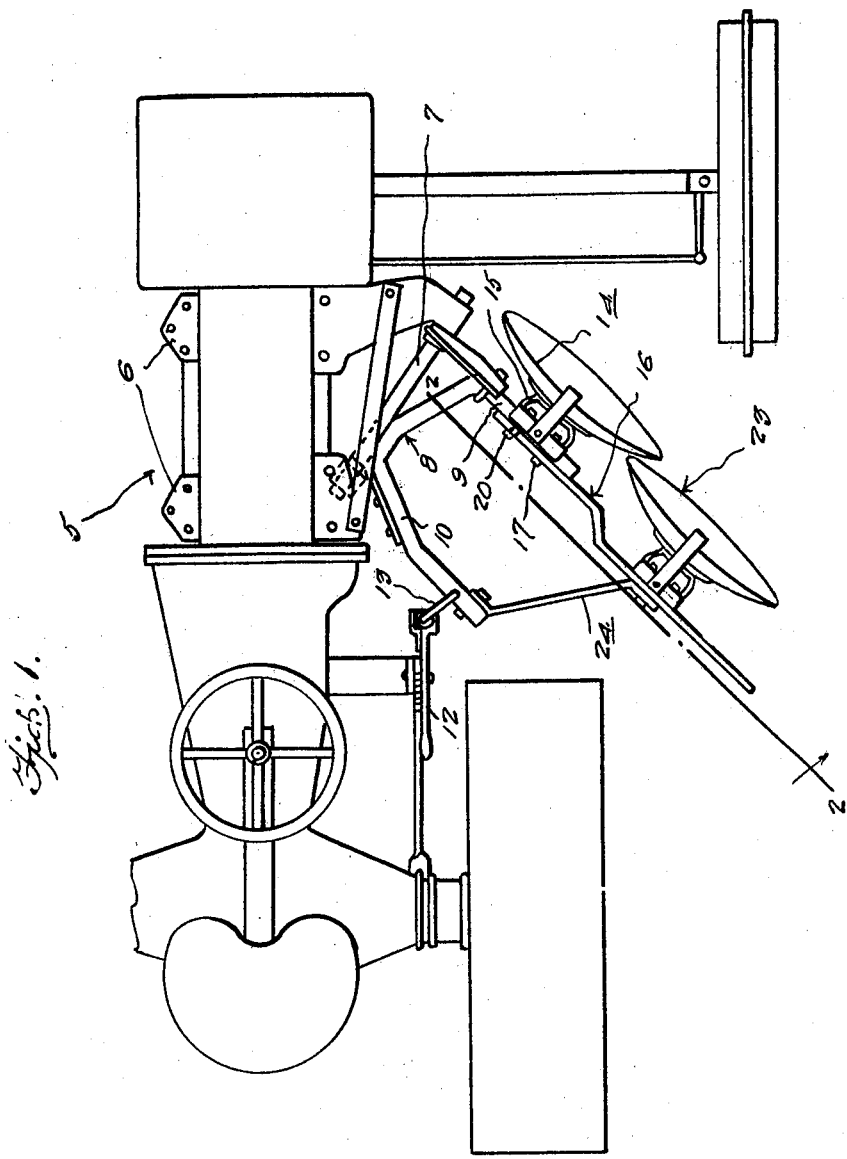
Figure 1 is a top plan view showing the old tractor plow characterized by the supplemental improvements as constructed in accordance with the present invention.

In the drawings in Figure 1, the reference character 5 designates the tractor having attaching devices 6 fashioned to support a shaft 7 carrying a substantially U-shaped frame 8. This frame is rockably mounted on the shaft 7 and includes spaced parallel arm portions 9 and 10 respectively together with a lifting lever 12 and a connecting link 13. In the patented device mentioned, there is a concavo-convex disc 14 held in place by an appropriate attaching bracket 15 suitably fastened to the forward arm 9.

Figure 3:
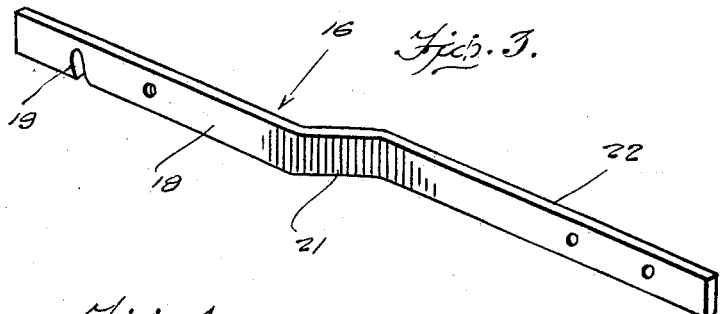
Figure 3 is a perspective view of the extension arm or bar.
Figure 4:
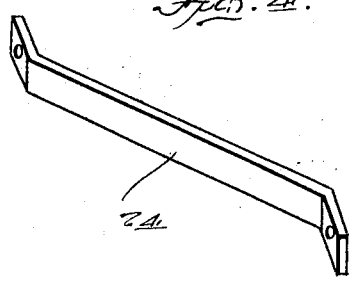
Figure 4 is a perspective view of a strengthening brace.

In accordance with the present invention, I provide an extension arm 16. This is pivotally connected by a bolt 17 with the arm 9. In addition, this arm 16 is of a peculiar configuration. Referring for instance to Figure 3, it will be seen that it is in the nature of a flat metal strip of appropriate metal having an inner end portion 18 provided with an arcuate keeper notch 19. This notch cooperates with a headed bolt 20 carried by the arm 19.

The intermediate portion 21 of the arm is laterally offset in a rearward and upward direction, this forming a suitably offset outer end portion 22 on which the supplemental concavo-convex disc 23 is attached. The numeral 24 designates a diagonal brace, one end of which is fastened to the free end portion of the arm 10, and the opposite end of which is bolted to the laterally offset end portion 22 of the extension arm 16.

Figure 2:
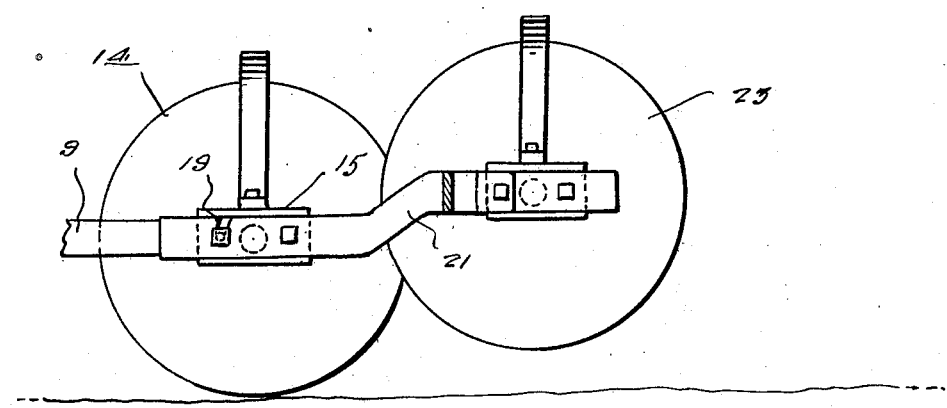
Figure 2 is a sectional view taken approximately on the plane of the line 2—2 of Figure 1.

It will be evident that the principal novelty in the improved arrangement is in the utilization of a pair of complemental plow discs 14 and 23 respectively, wherein the disc 14 is disposed in a normal plane and the disc 23 elevated with respect thereto as seen in Figure 2. The peripheral portion of the disc 23 is arranged in close proximity to and in fact in overlapping relationship with the corresponding portion of the disc 14 and this provides for the difference in elevation in treating the ground and in forming the terrace and the ditch.

The entire frame 8 is susceptible of vertical swinging action on the pivots and this is accomplished by operating the lever 12. The disc 23 and its attachments move as a unit with the frame 8. However, the disc 23 has independent movement because the arm 16 is pivoted at 17 for this purpose, thus allowing the desired freedom of motion with the disc 23 with respect to the front disc 14.

It is thought that persons skilled in the art to which the invention relates will be able to obtain a clear understanding of the invention after considering the description in connection with the drawings. Therefore, a more lengthy description is regarded as unnecessary.

Minor changes in shape, size, and rearrangement of details coming within the field of invention claimed, may be resorted to in actual practice if desired.

I claim:

1. In a structure of the class described, in combination, a mobile support, a frame swingably mounted thereon, a front plow disc carried by said frame, and a complemental rear plow disc associated with said front plow disc and supported in a plane above said front plow disc.

2. In a terracing and ditching plow of the class described, a mobile support, a stationary axle mounted thereon, a substantially U-shaped frame rockably supported on said axle, means for raising and lowering said frame, a concavo-convex plow disc mounted on the front arm of said frame, an extension arm carried by said front arm and extending outwardly and rearwardly and a second concavo-convex disc carried by said extension arm.

3. In a machine of the class described, a mobile support, a horizontal axle mounted in a substantially diagonal position on said support, a substantially U-shaped frame rockably supported on said axle and having spaced parallel arms extending rearwardly in a direction substantially oblique to the line of draft, means for raising and lowering said frame, a plow disc supported on the front arm of the frame, a second plow disc supported on said front arm and located in a plane above said first named plow disc and having its peripheral edge portion overlapping the corresponding portion of said first named disc.

4. In a structure of the class described, in combination, a tractor, a horizontally disposed shaft mounted thereon, a substantially U-shaped frame rockably mounted on said shaft and disposed in a rearwardly inclined direction, a plow disc rigidly fastened on the forward arm of said frame, an extension arm pivotally mounted on said forward arm and extending in an outwardly and rearwardly inclined direction, and a second plow disc mounted on the outer end portion of said extension arm, said outer end portion being offset upwardly and laterally to dispose the second disc in an elevated position with respect to the ground and with respect to said first named disc, the peripheral edge portions of said discs being disposed in spaced overlapping relationship.

5. A tractor plow attachment of the class described comprising an extension arm having a pivot bolt hole at its inner end and an adjacent keeper notch in its upper edge, the outer end portion of said arm being offset laterally and upwardly, a concavo convex disc carried by said offset end portion of the arm, and a brace fastened to said outer end portion of the arm.

In testimony whereof I affix my signature.

HENRY C. GRAWUNDER.